US007089281B1

(12) United States Patent
Kazemi et al.

(10) Patent No.: US 7,089,281 B1
(45) Date of Patent: Aug. 8, 2006

(54) LOAD BALANCING IN A DYNAMIC SESSION REDIRECTOR

(75) Inventors: Saied Kazemi, Irvine, CA (US); Alan Wright, Laguna Niguel, CA (US); Dai Ngo, Laguna Hills, CA (US); Reza Sabdar, Irvine, CA (US); Reza Sadri, Irvine, CA (US); Steven Higgins, Tustin, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 426 days.

(21) Appl. No.: 10/057,842

(22) Filed: Jan. 24, 2002

Related U.S. Application Data

(63) Continuation of application No. 10/014,897, filed on Dec. 10, 2001, now abandoned.

(60) Provisional application No. 60/268,804, filed on Feb. 14, 2001, provisional application No. 60/254,474, filed on Dec. 8, 2000.

(51) Int. Cl.
*G06F 15/16* (2006.01)
*H04B 7/00* (2006.01)

(52) U.S. Cl. .................... 709/203; 709/213; 709/216
(58) Field of Classification Search ............... 709/203, 709/205, 206, 207, 217, 223, 225, 227, 228, 709/232, 234, 235; 370/229, 351, 464
See application file for complete search history.

(56) References Cited

U.S. PATENT DOCUMENTS

| | | | | |
|---|---|---|---|---|
| 5,774,668 A | * | 6/1998 | Choquier et al. | 709/223 |
| 5,884,046 A | * | 3/1999 | Antonov | 709/238 |
| 5,913,028 A | * | 6/1999 | Wang et al. | 709/203 |
| 5,919,247 A | * | 7/1999 | Van Hoff et al. | 709/217 |
| 5,928,323 A | * | 7/1999 | Gosling et al. | 709/203 |
| 5,951,694 A | | 9/1999 | Choquier et al. | |
| 6,006,264 A | | 12/1999 | Colby et al. | |
| 6,012,085 A | | 1/2000 | Yohe et al. | |
| 6,014,698 A | | 1/2000 | Griffiths | |
| 6,018,619 A | | 1/2000 | Allard et al. | |
| 6,065,043 A | | 5/2000 | Domenikos et al. | |
| 6,070,191 A | * | 5/2000 | Narendran et al. | 709/226 |
| 6,138,162 A | * | 10/2000 | Pistriotto et al. | 709/229 |
| 6,167,446 A | | 12/2000 | Lister et al. | |
| 6,173,322 B1 | * | 1/2001 | Hu | 709/224 |
| 6,185,601 B1 | * | 2/2001 | Wolff | 709/203 |
| 2002/0103913 A1 | * | 8/2002 | Tawil et al. | 709/229 |

* cited by examiner

*Primary Examiner*—Zarni Maung
*Assistant Examiner*—Dhairya A. Patel
(74) *Attorney, Agent, or Firm*—Michael C. Martensen; William J. Kubida; Hogan & Hartson LLP

(57) ABSTRACT

A dynamic session redirector provides the ability to receive requests for network accessible storage resources and redirect them to the appropriate resources as needed while providing a single system image to the system requesting access to the resources. The redirector provides an ability to reconfigure the network storage resources in order to balance the load among the servers. By altering the association between individual storage resources and the servers responsible for them on the storage network, a more efficient and reliable system for access to the data may be provided.

14 Claims, 8 Drawing Sheets

LOAD BALANCING IN A DYNAMIC SESSION REDIRECTOR

REFERENCE TO RELATED APPLICATIONS

This application is a continuation of application Ser. No. 10/014,897, filed 10 Dec. 2001, now abandoned "LOAD BALANCING IN A DYNAMIC SESSION REDIRECTOR," which claims priority benefit under 35 U.S.C. §119 (e) from U.S. Provisional Application No. 60/254,474, filed 8 Dec. 2000, entitled "DYNAMIC SESSION REDIRECTOR" and from U.S. Provisional Application No. 60/268,804, filed 14 Feb. 2001, entitled "DYNAMIC SESSION REDIRECTOR" all of which are hereby incorporated herein in their entirety by reference.

BACKGROUND OF THE INVENTION

1. Field of the Invention

The present invention relates to data storage. More specifically, the invention relates to the balancing of access to data among available resources in a storage network.

2. Description of the Related Art

With the continued increase in the usage of electronic systems for the storage and distribution of information, it has become desirable for users of such systems to have access to ever larger storage facilities. Particularly when working with graphical and video information, the amount of storage that may be required can become much larger than the amount of storage available in a single disk drive or other storage medium.

Various systems have been developed which provide access to an aggregation of storage via an electronic network. Generally such systems involve large numbers of individual storage units arranged in a variety of architectures and accessible via the network. However, simply providing access to a large number of individual resources may present difficulties in configuration, maintenance and performance.

In particular, because the patterns of access to individual volumes within the storage system may vary over time, a particular distribution of storage units among the available servers to handle them may require periodic adjustment in order to attain better throughput. Additionally, in the event of failure of servers or storage units, it may be desirable to reconfigure the storage system in order to accommodate the change in capabilities due to the failure.

Therefore, there is a continued need for improved systems and methods for reconfiguring storage systems involving multiple storage units during their operation in order to maintain efficient and effective access to the data stored within.

SUMMARY OF THE INVENTION

One aspect of the system described herein is a dynamic session redirector (DSR) which is used to provide a single system image for access to network resources which may be distributed among many individual devices. By redirecting network requests received by the DSR to storage resources on the network, network resources being shared through the DSR can be presented using a single system image to network clients.

Another aspect of the DSR system presented is that the DSR examines the incoming requests and passes them on to the appropriate resources and then forwards the results of any request to the requesting client. Requests are sent to the DSR from client systems and the DSR responds as though the storage resources were part of the DSR.

According to yet another aspect of the system, dynamic remapping of the servers providing access to particular resources may be performed. In particular, this may be performed in order to balance the load between the servers. This load balancing may be performed in order to respond to variations in activity or demand for particular resources, in response to failures of individual components within the storage system, or in response to expected variations in activity or demand. By allowing the DSR to reassign resources in this way, client sessions and connections may be maintained without interruption even when components fail or the resources involved in existing connections are remapped to other servers during a session.

Further aspects of the system involve the use of individual network attachable storage (NAS) devices to the DSR in order to provide resources that the DSR is able to share with clients on the network. These network attachable storage devices may comprise either stand-alone devices or a storage area network (SAN) which provides servers that provide access to individual resources.

Another aspect of the system involves integrating the DSR with a network switch or other network routing apparatus. By providing a network switching function in the DSR, the requests that the DSR makes of the storage resources may be performed in hardware rather than software, improving the efficiency of the redirection function.

In another aspect of the invention, a technique to redirect network storage requests which are made using both stateful and stateless protocols is provided. The DSR maintains a set of tables which store the state of the various sessions initiated between the clients and the DSR, as well as the status of individual connections established by clients with particular resources. Incoming requests are modified and redirected to the appropriate systems on the storage side of the DSR in order to provide transparent access to the resources available to the clients through a single DSR interface.

Another aspect of the system provides for allowing a single session between the DSR and a client to support multiple connections to resources which may be accessed through different storage systems on the storage side of the DSR. This operation occurs transparently to the client, and provides for a single system interface between the client and the resources, even when the resources are spread among a number of storage devices or servers.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of the invention are described in more detail below in connection with the attached drawings, which are meant to illustrate and not to limit the invention, and in which.

DETAILED DESCRIPTION OF THE PREFERRED EMBODIMENTS

The following description and Figures describing the preferred embodiments are made to demonstrate various configurations of possible systems in accordance with the current invention. It is not intended to limit the disclosed concepts to the specified embodiments. In addition, various systems will be described in the context of a networked computer system for carrying out the described techniques and methods. Those of skill in the art will recognize that the techniques described are neither limited to any particular type of computer or network, nor to the use of any particular hardware for every described aspect herein.

To facilitate a complete understanding of the invention, the remainder of the detailed description describes the invention with reference to the Figures, wherein like elements are referenced with like numerals throughout. Reference numbers in parentheses, for example "(600)", are used to designate steps or processes.

Overview

Figure 1:
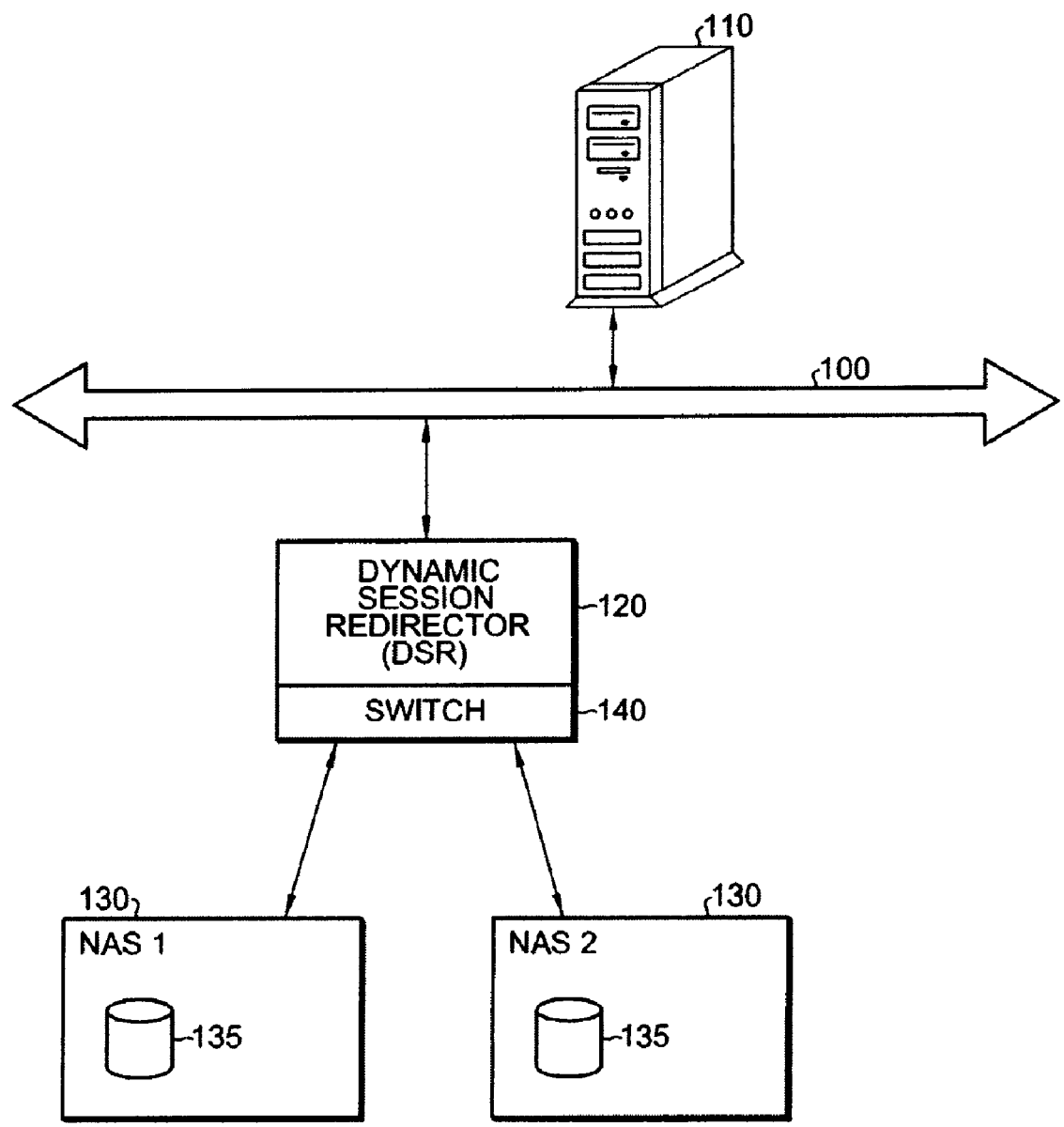
FIG. 1 illustrates a block diagram of a network configuration for use with a dynamic session redirector in accordance with one embodiment of the invention.

One aspect of the present system involves a system to redirect network requests for resources to systems providing these resources in a manner which is transparent to the client requesting access to the resources. A system demonstrating this capability is shown in FIG. 1 and described herein. A network 100 is shown to which a client system 110 is connected. The network 100 may be any standard network for connecting electronic systems as is known in the art, for example an Ethernet network. Although only a single client system 110 is shown in FIG. 1, the described system is not limited to a single client system; indeed, it is contemplated that multiple client systems 110 can connect to the network 100.

The client 110 may use the network to request access to information which is stored on other systems. In the embodiment shown in FIG. 1, these requests are sent from the client 110 to the dynamic session redirector (DSR) 120. The DSR is connected to the same network 100 as the client 110, and receives requests for access to resources 135 via the network 100. Although the network as shown in FIG. 1 includes a network backbone with the client 110 and DSR 120 connected to it, the network 100, however, may include additional devices to facilitate network communication. For instance, routers, hubs, switches, and other networking components may be used to provide for network connections between the client 110 and the DSR 120 without altering the nature of the system described herein. The words "hub" and "switch" are used broadly and interchangeably herein to include hubs switches, routers, gateways and such other networking hardware providing similar functions.

The DSR 120 is connected to one or more network storage devices 130. Each network storage device provides storage resources 135 which may be made available to the DSR 120. These resources 135 are in turn made available by the DSR 120 to clients 110 via the network 100.

In one embodiment, the network storage devices 130 may comprise network attachable storage (NAS) devices which are directly connected to the DSR 120, as shown in FIG. 1. In such configurations, it is desirable for the DSR 120 to include a network switch 140 or similar component in order to allow the NAS devices 130 to be connected to the DSR. In an alternate embodiment, storage devices 130 comprising network attachable storage may simply be connected to the same network 100 that is used for communication between the client 110 and the DSR 120.

In operation, the DSR 120 is visible to a client 110 or other machine on the network 100 as providing the resources 135 of the various network storage devices 130 directly. In one embodiment, any client 110 on the network is unable to access the storage devices 130 directly, but rather accesses the DSR 120. Conversely, the storage devices 130 do not make their resources 135 available to any clients 110 directly, but rather only to the DSR 120. In this way, the DSR 120 may serve as a bi-directional proxy between the resources 135 which are made available by the storage devices 130, and the client 110 which requests access to the devices. In alternate embodiments, storage devices may be made accessible to both the DSR and to the clients directly.

When the client 110 wishes to access a resource 135, such as a particular volume of disk storage, the client initiates a communications session with the system providing the desired resource. Because the resource is visible to the client as being part of the DSR 120, the client 110 initiates a session with the DSR 120, and the DSR responds, producing a communications session between the DSR and client. This may take place using any of a variety of standard networking protocols, such as Server Message Block (SMB), Common Internet File System (CIFS), Network File Service (NFS), i-SCSI or other similar file or block level protocols as are known in the art. These protocols may include state information related to the communications session, and will generally be transported within another networking protocol such as TCP or NetBIOS.

Once the session is established between the client 110 and the DSR 120, the client may request a connection to one of the resources 135 being made available through the DSR 120. When such a connection is requested, the DSR 120 receives the request for the connection from the client 110, and then proceeds to relay the request to the appropriate storage device 130 which is handling the particular resource 135 for which access is requested. In order to do this, the DSR 120 keeps a table of the resources provided by each network storage device. Throughout this document, the word "table" is defined broadly to refer to any data structure for later access, including without limitation a table, a list, a database, executable program logic to store data, object oriented code, arrays, variables or any other structure for storing and retrieving data. The DSR determines which of the network storage devices 130 will handle the resource 135 requested, and then the DSR modifies the connection request it received from the client 110 and passes the request on to the appropriate network storage device 130.

The request is modified so that rather than appearing to be a request from the client 110 directly to the network storage device 130, the request appears to the storage device to be originating from the DSR 120. When the DSR 120 receives the reply from the storage device 130, a response to the client 110 is prepared by taking the response received by the DSR from the storage device and making it appear to originate from the DSR, and then sending it to the client 110. This provides the client with the impression that the resource 135 is part of the DSR and the storage device with the impression that the request was made from the DSR.

In this way, the burden may be reduced on the network storage device associated with establishing sessions, authenticating, maintaining status, broadcasting resource availability, or any of the other functions that might otherwise be required if the storage device were making its resources 135 directly accessible to the clients 110 on the network 100. The storage device 130 interacts with the DSR 120, and the DSR handles interaction and coordination with the clients 110. In this way, the DSR 120 acts as a front end for the storage devices 130 and their resources 135, handling and brokering requests, storing session related data such as client authorizations, while isolating the data storage devices 130 and the client 110 from one another.

One advantage of allowing the DSR to act as a front end for the resources 135 provided by the storage devices is that a single system image of the resources 135 available via any number of network storage devices 130 may be provided to a client 110 on the network 100. This provides for a simpler view of the available resources to the client 110 and also means that a single session between the client 110 and the DSR 120 may provide the basis for connections to any of the resources 135 on any of the storage devices 130. If the storage devices were directly accessible by the client 110, then the client could alternatively initiate a session with each storage device having a resource to which the client wanted to connect.

As noted above, in one embodiment it may be advantageous to integrate the functionality of a network switch 140 within the DSR 120 in order to improve the efficiency of the connections made among the various storage devices 130 and any clients 110 on the network 100. Because the connection between each storage device 130 and the DSR 120 may be made from a separate port of the switch 140, the DSR can more efficiently send and receive messages from each storage device 130 without having a single network port handle data from more than one storage device. By moving this switching function into the network switch 140, the DSR 120 can process more requests and connections more efficiently.

Alternate Embodiments

Figure 2:
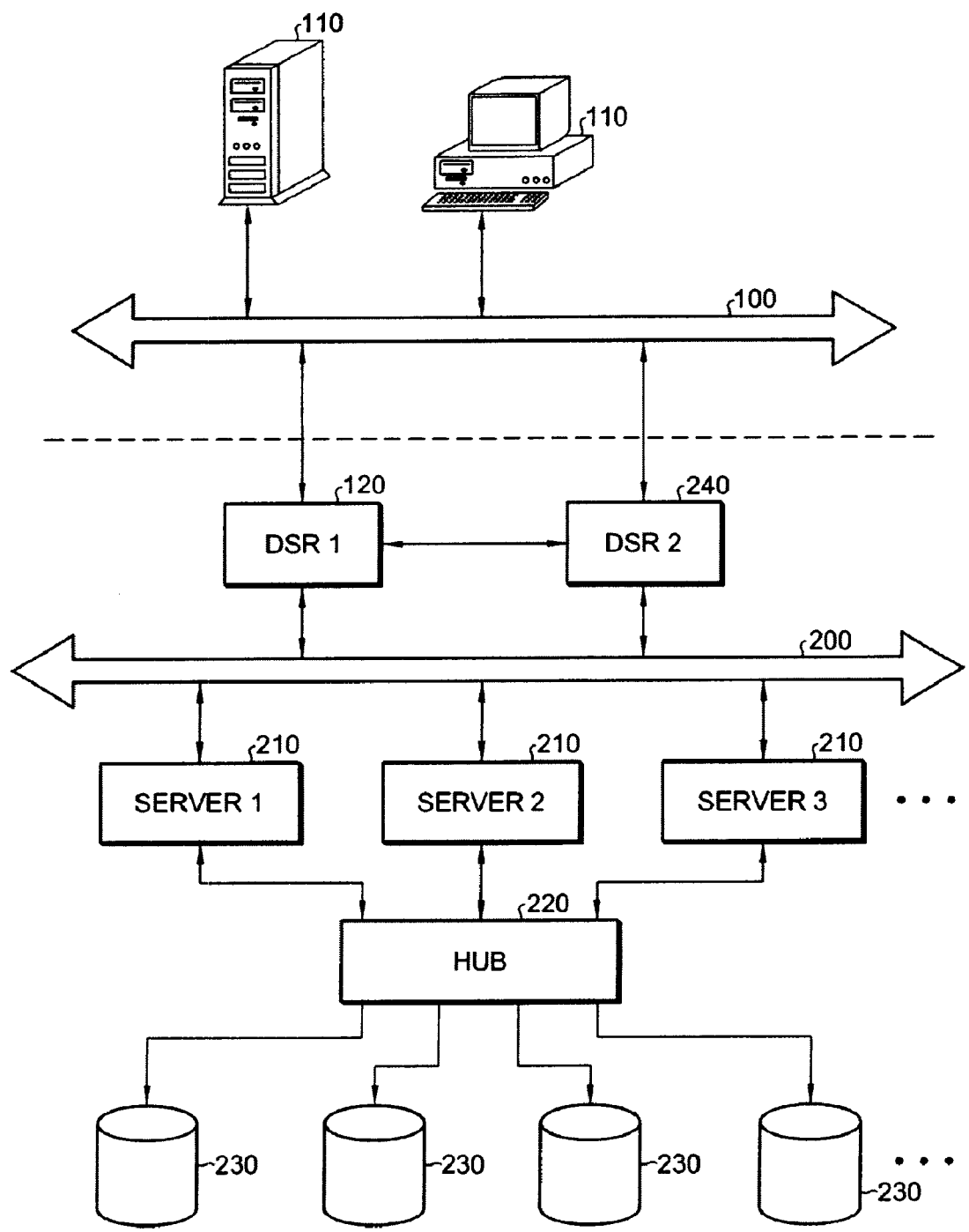
FIG. 2 illustrates an alternate embodiment to that shown in FIG. 1 of a network for use with a dynamic session redirector in accordance with another embodiment of the invention.

In addition to the embodiments described above, the DSR may also be used in alternate implementations that replace the network storage devices 130 shown in FIG. 1 with a different configuration of storage devices. One such configuration is shown in FIG. 2 and described below. As can be seen in FIG. 2, the network 100 is still used as a communications medium between the clients 110 and the DSR 120. The clients 110 initiate communication sessions and request connections to network resources from the DSR in the same way they would in the embodiment shown in FIG. 1 and described above.

Instead of connecting directly to storage devices, the storage side of the DSR 120 is connected to another network 200. This network is used to connect the DSR to one or more storage servers 210 that are used to handle access to a storage area network (SAN). Note that as discussed above, it may also be possible to include NAS devices within the storage are network itself. As used herein, the term "server" is defined broadly to include any hardware or software which provides and controls access to resources for remote systems. For example, a server may be a standalone computer running any of a variety of operating systems, a dedicated piece of hardware which performs only server functions, or a process running on a general purpose computer.

The storage area network may preferably comprise a hub 220, such as a fiber channel hub to which one or more storage resources 230 are connected. The resources 230 of this storage area network are made available to the clients 110 in much the same way as is described for the configuration of FIG. 1 above. However, because each storage server 210 has access via the hub to each of the storage resources 230, bottle-necks in performance may be avoided by allowing access to each resource 230 through more than one server 210. In alternate embodiments, the SAN may comprise a network which does not use a fiber channel architecture. For instance, the SAN may use any of the following architectures in place of fiber channel without limitation: ethernet, Virtual Interface (VI), Infiniband, SCSI architectures including SCSI over ethernet (I-SCSI), and other similar architectures.

When requests for connections to resources 230 are received by the DSR 120, the DSR prepares an appropriate request to whichever server 210 which is capable of fulfilling the request for the resource 230. Because the storage area network may provide access to a particular resource through more than one of the servers 210, the DSR 120 may choose which server 210 to contact based upon other criteria. These may include criteria such as response time, throughput, or such other criteria as are known to those of skill in the art. When the request is received by the appropriate server, it passes the request through the hub 220 to the appropriate resource and receives a response. The response is forwarded back to the DSR by the server 210. The DSR 120 then sends a response to the requesting client 110 as if the resource 230 were a resource directly connected to the DSR itself.

As discussed with reference to FIG. 1 above, this embodiment provides a single system image of the resources being available directly from the DSR 120 when viewed by a client 110, and provides a source of requests (i.e. the DSR) for the storage area network. The use of a storage area network, as opposed to a group of network attached storage devices also may provide benefits in terms of scalability and reliability.

Another feature shown in FIG. 2 is a second DSR 240 operating in parallel with the primary DSR 120. The second DSR 240 may provide additional resources in order to improve throughput of the system, and may also serve as a redundant backup system to take over in the event that the first DSR 120 becomes inoperable. The second DSR 240 is connected to the client network 100 in the same manner as the first DSR 120, and also has access to the storage side network 200. In this way the second DSR 240 is capable of processing the same requests and redirecting the same resources 230 as the first DSR 120.

In one operating mode, both DSRs, 120, 240 are operating at the same time and each receives requests from clients 110 and processes them as described herein in order to provide the functions of a DSR. In this mode, each DSR is providing access to the clients 110 to the storage resources 230 independently and without communication with the other DSR. In such a mode, each client 110 message received is processed by one or the other DSR, but not both.

If the first DSR 120 is to fail in such a mode, any attempt to communicate with any resources through the DSR 120 will also fail, and the clients 110 will recognize that their connections and sessions have been terminated. Because the second DSR 240 will still be operative, requests for sessions and connections to resources from that point forward will be made through the second DSR. The second DSR 240 will still be providing access to the same resources 230, because the second DSR 240 has the same access to the SAN as the first DSR 120 did. As a result, access to no resources 230 are lost when the first DSR 120 fails, as long as the second continues to run.

However, because particular sessions and connections to resources made with the first DSR 120 have been lost, any client working with a connection or session from the first DSR will have to attempt to reconnect to the appropriate resources. New requests for connections and sessions will be handled by the second DSR 240. As the second DSR 240 receives the appropriate information with each session or connection request from a client 110, this information will be added to the resource and state tables of the second DSR 240. This will allow the second DSR to handle the redirection that was handled by the first DSR 120.

In another operating mode, each DSR 120, 140 maintains a connection to the other DSR specifically for the purpose of exchanging information related to the state of the various sessions and connections that each is processing. This "heartbeat" connection is used to provide an indication to each DSR that the other is still operational, as well as to allow each to keep a redundant table of any state information that may be necessary in order to process requests from clients 110. In this way, each DSR may operate as a real-time backup of the other, and any incoming message may be handled by either DSR. This also means that a request for a connection within a session initiated with the first DSR 120 may be handled by the second DSR 240 transparently, since each DSR is aware of the state information associated with each client 110 and session and connection at all times.

If the first DSR 120 fails in such a mode, the second DSR 240 may take over any requests made of the first DSR 120 without terminating existing sessions that were made with the first DSR 120 and without requiring the clients 110 to reconnect or reestablish their credentials with the second DSR 240. By using the heartbeat connection to maintain redundant state information between the two DSRs, any data that is identified as being relevant to the state of any session or connection is updated to the other DSR, allowing each to process requests initially intended for the other.

In such cases, when the second DSR 240 detects that the first DSR 120 has failed, it may simply begin responding to any requests which are made of the first DSR as if it were the first DSR itself. The clients 110 need never know that the first DSR 120 has failed, or that their requests are being handled by a different system. This allows existing sessions and connection to continue to operate in a manner transparent to the client 110 and without interrupting any of the data transactions which may be in process between the client 110 and any resources 230 on the storage area network.

In order to facilitate either of these redundant operating modes, the DSR's may be configured to operate using redundant network interfaces and network switches. Additionally, as will be apparent to those of skill in the art, the first DSR 120 is capable of taking over in the event that the second DSR 240 fails in the manner as described above for the second DSR 240 taking over from the first. It should also be noted that the number of DSRs may be extended to more than two in circumstances where even greater redundancy and reliability is desired. The described techniques may be extended as necessary to handle any number of redundant DSR's connected between the client network 100 and the storage area network 200.

Figure 3:
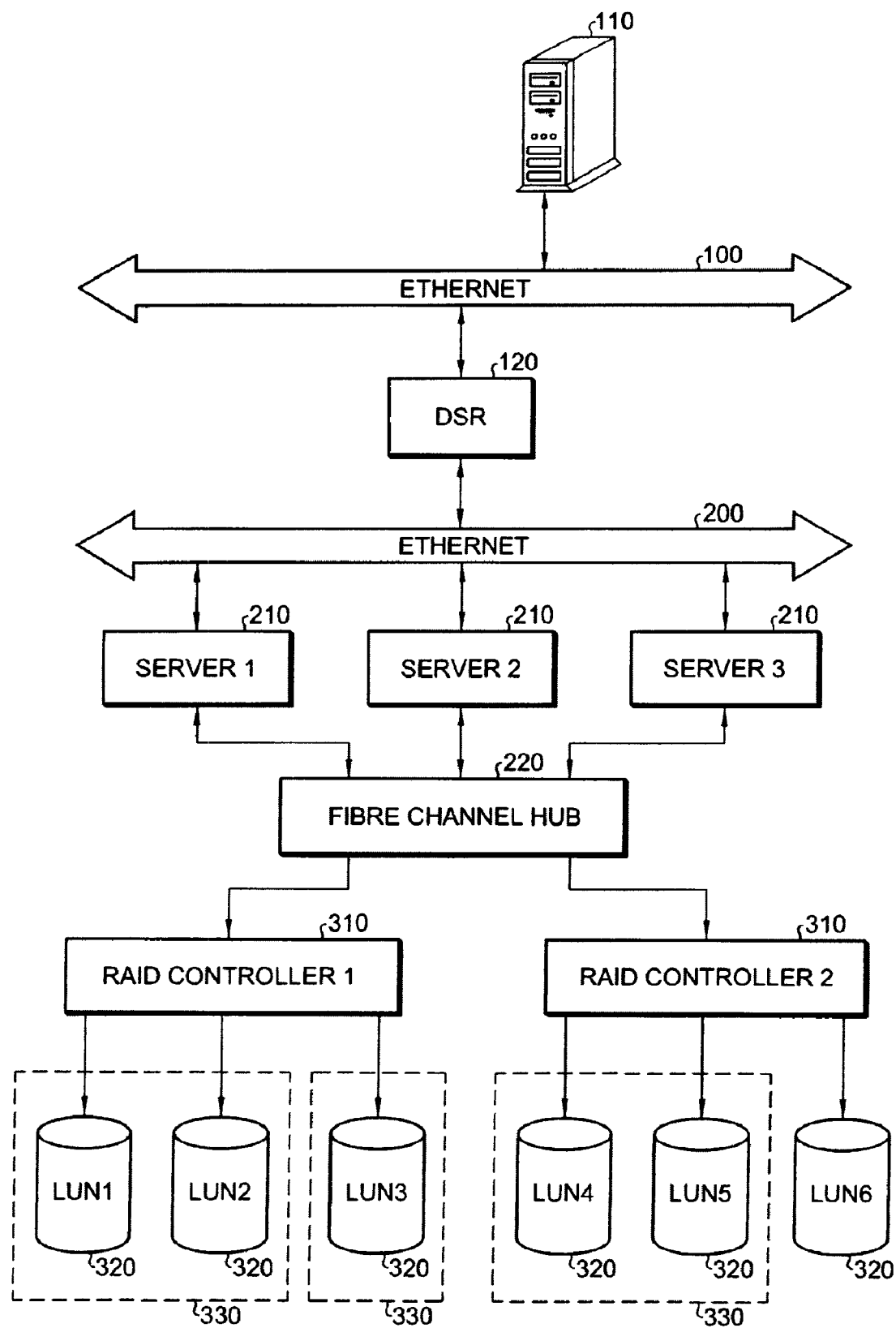
FIG. 3 illustrates another embodiment of a network using a dynamic session redirector.

An additional embodiment using a storage area network is shown in FIG. 3 and described below. As with the embodiment shown in FIG. 2, the client 1110 and the DSR 120 communicate via a network 100, and the DSR 120 communicates with one or more storage servers 210 via a second network 200. The storage servers 210 are connected to a hub 220 on a storage area network but the individual storage units 320 are not accessed directly by the servers 210 through the hub 220. Instead, one or more RAID controllers 310 are used to organize the individual storage units 320 into volumes. These volumes may be made available as resources by the RAID controllers 310 to the DSR 120 across the storage area network.

As in the previous embodiments, the individual volumes that are logically created by the RAID controllers 310 may be visible to clients 110 on the first network 100 as though those volumes were part of the DSR 120 itself. This configuration may provide advantages in efficiency, failover operation and such other benefits of RAID configurations as are known to those in the art.

Redirection Technique

Although several embodiments of systems including a DSR 120 for use in managing access to a set of network resources are described herein, the following discussion will be made with particular reference to FIG. 2 and the embodiment shown therein. However, the description, including the techniques described can also apply to embodiments other than the exemplary embodiment of FIG. 2. In particular, the various embodiments illustrated and described herein may also advantageously make use of such techniques.

Figure 4:
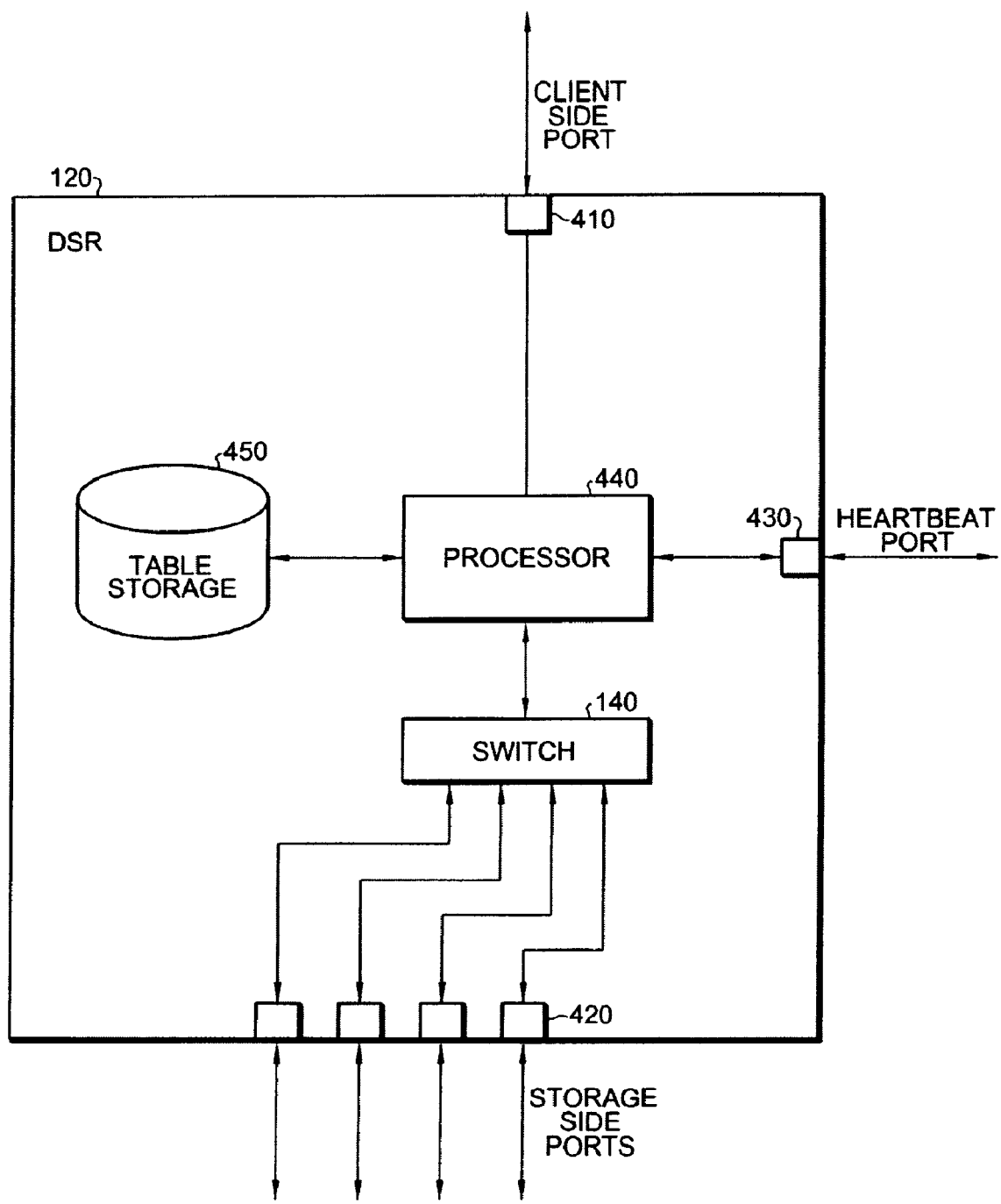
FIG. 4 illustrates a block diagram of the components of a DSR in accordance with an embodiment of the invention.

In the discussion which follows, reference may be made to the exemplary DSR 120 illustrated in FIG. 4 and described below. As shown in FIG. 4, the DSR may comprise electronic hardware configured to perform a variety of functions. In particular, the DSR may comprise a client side network port 410 or interface for connecting to the client side network 100 of FIG. 2, as well as one or more storage side network ports 420 for connecting to the storage network attached 200 to the DSR.

In embodiments as described above where it is advantageous to include a network switch 140 within the DSR 120, the switch 140 will generally be connected to the storage side network ports 420. Such an arrangement may be particularly advantageous when the storage side of the system comprises a number of NAS devices 130 such as are shown in FIG. 1. Connecting different NAS devices 130 to separate ports of the switch 140 may allow for greater throughput of the DSR 120 and fewer collisions on the storage side of the network. In configurations, such as those shown in FIGS. 2 and 3, where the storage side of the DSR 120 is connected to a second storage area network 200, it may be less advantageous to have multiple storage side network ports 420, and a single network port to connect to the SAN 200 may be used. Those of skill in the art will recognize that the DSR 120 may be made to operate with either SAN or NAS components regardless of the number of storage side network ports 420 included. The exemplary embodiment of the DSR 120 illustrated in FIG. 4 includes an integral network switch 140 supporting four storage side network ports 420.

In addition to the client side port 410 and storage side port(s) 420, the DSR 120 may also include one or more heartbeat connection ports 430. These connections may be used as described above to communicate with other DSRs in order to exchange state information and provide information related to the status of each DSR.

The operation of the DSR 120 and the processing of the various information which is received and sent via the ports described above 410, 420, 430 is handled by the processor 440 of the DSR 120. The processor may comprise a computer, program logic, or other substrate configurations representing data and instructions which operate as described herein. In alternate embodiments, the processor can comprise controller circuitry, processor circuitry, processors, general purpose single-chip or multi-chip microprocessors, digital signal processors, embedded microprocessors, microcontrollers and the like. The processor 440 as defined herein may include any such hardware, software, firmware, memory, storage, and input/output and peripheral components as are needed to carry out the functions described herein.

For example, the DSR 120 may operate on any of a variety of computer hardware architectures and operating systems, including Intel/Windows architectures, RISC architectures, Macintosh architectures and other similar architectures. The operating systems may similarly include without limitation: Microsoft Windows, UNIX, Linux, Macintosh OS, and embedded and real-time operating systems. A particular embodiment of the DSR 120 may be based, for example, upon a Linux operating system running on a variety of hardware platforms.

In addition to the processor 440 described above, the DSR 120 maintains a storage area 450 to track a number of tables as are described herein. These tables may be used to store information related to the state of various sessions and connections made by clients 110 to the resources 230 provided. The tables may also store information related to the operation of redundant DSRs connected via heartbeat connections and credential information for any users that are authenticated through the clients 110. This information may be maintained with the DSR in the storage 450 area and accessed for both reading and writing by the processor 440 as necessary during the operation of the DSR 120.

The DSR 120 as shown in FIG. 4 operates as an intermediary between the client 110 and the resources which are being made available to the client. In particular, the DSR provides techniques for requests being made using both stateless and stateful communications protocols to be redirected from the DSR itself to the appropriate resources transparently to the client.

In a stateless communications protocol, for instance NFS V.2 or NFS V.3, individual connections between a client 110 and a network resource 135 are made with no need to track information from one request to the next. This operation is normally advantageous in that very little overhead is required for the processing of each individual request, because no status has to be tracked from one request from a client 110 for a particular resource 135 to the next. However, when many connections are being made between the same clients and resources, such a stateless protocol results in redundant processing of many equivalent requests. For instance, because there is no tracking of status from one request to the next, requests from the same client 110 for different information from the same resource 135 may result in repeated and duplicative authentication, identification and lookup operations as the system determines whether or not the client 110 is to be given access to the particular resource.

The DSR 120 described herein provides a particular advantage even when redirecting stateless protocols in that it may track certain state information related to the connections being made by clients 110 to the various resources 135 and use this information to streamline future requests made by this client.

In addition to tracking state information for the communications protocols, the DSR may also provide a table which stores the authentication credentials of the clients 110 that establish sessions with the DSR. By maintaining a table of this information, the DSR 120 may provide credentials as needed for a particular client to any server 210 to which it may connect in order to provide access to a resource to a client. This avoids a need to get credentials from the client 110 every time a new connection is established.

For instance, when a client 110 makes a request for data from a particular resource 230, the DSR 120 determines which of the servers 210 are responsible for providing access to that resource. In a stateless protocol this information is not stored because the individual server may not be the same the next time that particular resource is accessed by a client. However, by the use of a DSR 120 capable of tracking state of the mappings between particular resources and the appropriate server responsible for those resources, repeated access to that resource is streamlined.

After an initial determination of the mapping between a particular file handle and the appropriate server, the DSR may add that particular mapping to a table of correspondence between resources, such as file-handles or volume labels, and the server 210 responsible for that resource. This persistent mapping allows for the redirection of stateless protocols to be handled more efficiently through the use of a DSR 120 than would be possible if each client were responsible for directly connecting to resources 230, or if the DSR were forced to determine the appropriate server for the resource independently each time.

Multiplexing

Another aspect of the benefits available through the use of a DSR 120 as described above is to allow for the effective multiplexing of an individual session between a client 110 and the DSR 120 to produce a plurality of individual connections to various servers 210 from the DSR when providing resources 230 to the client. For instance, in a stateful network communications protocol such as SMB or NFS V.4, it is normal for a client to first establish a communications session with a server providing resources, and then to make connections to individual resources from that server. Requests for various types of access to that resource are then made within the context of that connection between the client and the resource.

However, because the DSR 120 serves as a sort of proxy between the client 110 and the resources 230 desired, there is not a one-to-one correspondence between the communications made between the client 110 and the DSR 120 on the network 100 side, and the communications made between the DSR 120 and the servers 210 on the storage side. The particular nature of the correspondence will depend upon the type of operation being performed.

Figure 5:
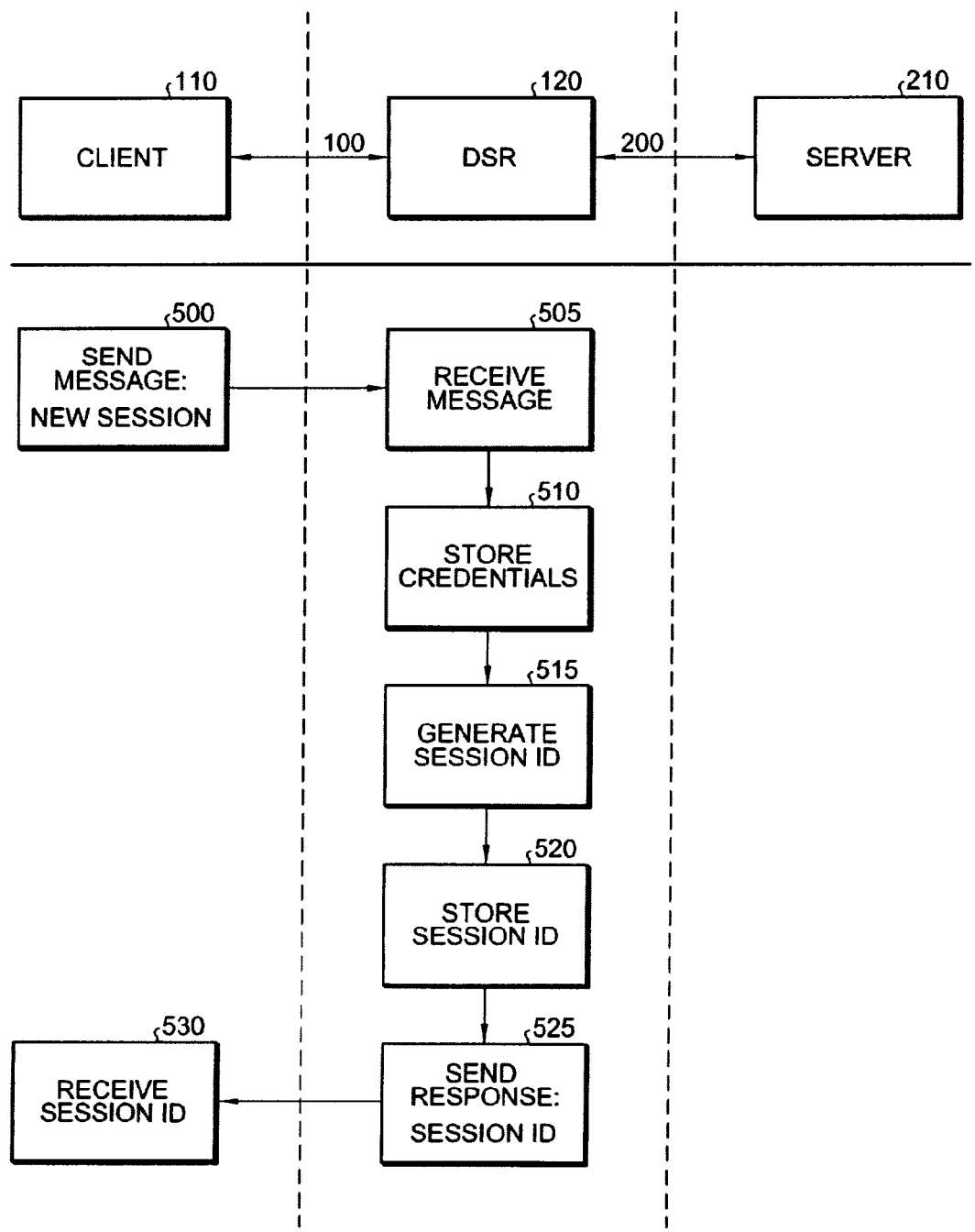
FIG. 5 illustrates a flow diagram for a process for initiating a new session between a client and the DSR.

For instance, when setting up an initial session between the client 110 and the DSR 120, there is no need for the DSR to make any communications with any of the servers 210 at all. As shown in FIG. 5, the client 110 will send a message to the DSR 120 to establish a session (500). The client 110 contacts the DSR 120 because the DSR is the only "server" that the client 110 can see on the network 100, and from the client side, the DSR provides access to the resources 230 directly. After the DSR receives the message (505), the DSR examines and stores any credentials forwarded by the client 110 (510) in the appropriate table 450 within the DSR (510) and then the processor 440 of the DSR 120 generates (515) and stores (520) a session identification for this particular client's session with the DSR. This session ID is then send back to the client 110 (525) where it is received by the client (530) and used for any further communications with the DSR related to this particular session.

As can be seen in FIG. 5, establishing this session does not require that the DSR 120 exchange any information with the servers 210, so a message to set up a session between the client 110 and the server handling any particular resource 230 does not actually generate any messages on the storage network 200 between the DSR 120 and the servers 210.

Note that this circumstance assumes that the DSR 120 has already established an appropriate registration of the particular resource 230 from whichever server 210 is managing that particular resource. This resource table is stored in the DSR 120 and is used to track what resources 230 are available for the DSR 120 to provide to clients 110. In one embodiment, the servers 210 are configured to automatically broadcast what resources 230 they are providing to the DSR 120 automatically upon startup. The DSR stores this information in the table.

A resource management process may be running on the DSR in order to maintain and update the resource table during the operation of the DSR. In addition to populating the resource table as information is received from servers 210 as they come online, this process also may update the table as needed if resources or servers become unavailable, or if control of a particular resource 230 is transferred from one server 210 to another for any reason, such as a failure of a single server 210.

In the above circumstances, when the message is received by the DSR 120 from the client 110 initiating either a session or a connection to a particular resource 230, the DSR is able to respond based upon the information it already has in the resource table, and need not make an additional communication with any of the servers 210 on the storage side.

Figure 6:
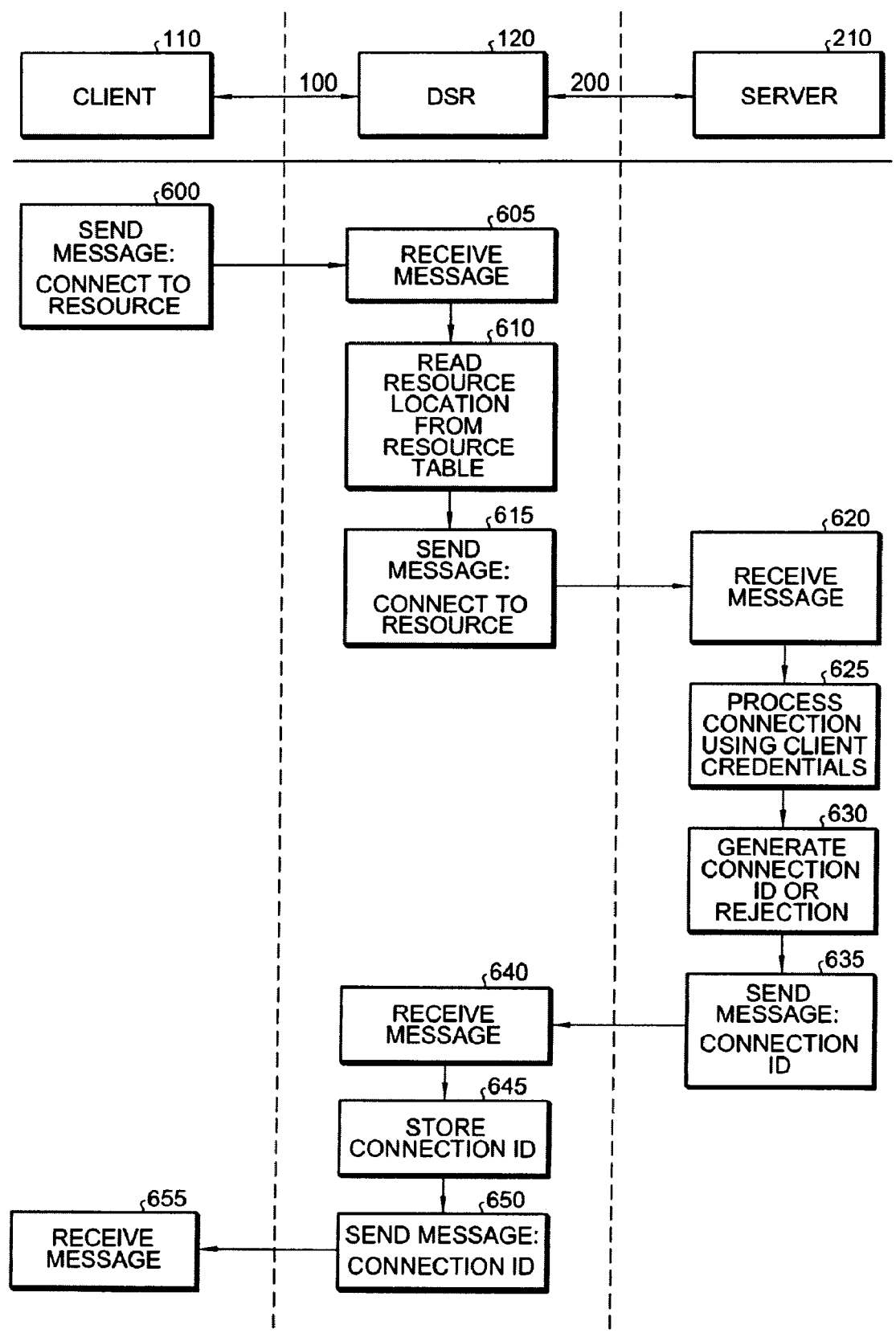
FIG. 6 illustrates a flow diagram for a process for a client to connect to a resource through the DSR.

By contrast to the situation shown in FIG. 5, when an actual connection to a particular resource 230 is request by a client 110, it is necessary to authenticate that client 110 for that resource 230. Similarly, when actually reading or writing data from a resource 230, it is clearly necessary for there to be some data exchange between the DSR 120 and the resource 230 through the appropriate server 210. The data flow associated with such operations is shown in FIG. 6.

When a client 110 requests a connection to a specific resource 230 (600), the message is received by the DSR 120 (605) and the server 210 associated with that particular resource 230 is located in the DSR's tables 450 (610). Once the appropriate server 210 is located, the DSR takes the request from the client and forms an equivalent request that is sent to the server 210 responsible for the resource 230 (615). The DSR 120 includes any appropriate credential or other identifying data that the server 210 would need to process this connection request. This information is also looked up from within the storage area 450 of the DSR.

The server 210 receives the message requesting a connection to the resource 230 (620) and proceeds to process this request based upon the credentials other information sent by the DSR 120 (625). If the credentials presented allow access to the resource 230, then the server 210 will establish the connection to the resource 230, generate an appropriate connection identifier (630) and return this identifier to the DSR 120 (635). If the connection is refused, then the rejection message is generated and returned to the DSR.

The DSR 120 receives the connection identifier (640) and stores this ID in the appropriate tables within the storage area 450 of the DSR (645). Once stored, a message is sent back to the client 110 (650) indicating the connection identifier or the rejection of the connection. The client 110 receives this message from the DSR (655) and is unaware that the resource 230 is actually handled by the server 210 and not the DSR 120.

This arrangement allows for multiplexing of connections between the DSR 120 and the servers 210 based upon a single session or connection between the client 110 and the DSR 120. In one configuration, a single session may be used to establish connections with resources 230 spread across multiple servers 210. This helps cut down on unneeded overhead associated with multiple connections. In addition to avoiding unneeded messaging between the DSR 120 and servers 210, the single system image provided by the DSR allows for the multiplexing of a single connection between the client 110 and DSR 120 to more than one server 210 on the storage side. For example, after establishing a session between the client 110 and the DSR 120, the client 110 may connect to a particular resource 230 made available by the DSR 120. This resource 230 may be handled by the first server 210 on the storage network. Any request related to a file or other transaction associated with that particular resource will be accepted by the DSR 120 and redirected to the appropriate server 210. The response from the server 210 will then be redirected back to the client 110 as if it originated from the DSR 120 itself.

However, a request for a different resource may be made by the same client to the DSR and handled properly without initiating a new session, even if this second resource is handled by a different server on the storage area network. Because the client 110 sees the resources as being provided by the DSR, a single session between the DSR 120 and the client 110 provides the ability to connect to any of the resources 230 available on the network 200 that the DSR is connected to. Therefore, establishing a single session to the DSR 120 enables the client to connect to the resources from any of the servers 210 without having to establish separate sessions to each. In this way, it can be said that the single session between the client and DSR is multiplexed into a plurality of connections to separate servers, all through the one session.

This multiplexing is accomplished by maintaining a session table in the DSR 120 that tracks the sessions that have been established between the DSR 120 and any clients 110, as well as information that is related to those sessions. This information may vary somewhat depending upon the particular protocols used but may include such information such as a session identifier, the connection identifier (the Tree ID in SMB), and a user identification which identifies the particular client 110 requesting any connection.

Because it is possible that a particular logical volume which is made accessible to the clients 110 as a single resource 230 may actually consist of multiple logical units 320 grouped together as a single volume 330, working with that volume 330 may actually require information from multiple logical units 330. These units may represent separate disks within a RAID structure (as will be discussed in greater detail below). Because the client 110 expects to make only a single request to access a single volume 330 (or other resource 230), if there are multiple logical units 320 which will be accessed to obtain that data, then the DSR 120 will make multiple connections to various resources in order to fill the request.

For instance, in the example shown in FIG. 6, the resource for which a connection was requested could be a logical volume 330 which was spread across three separate physical resources 320. In such a case, when the DSR 120 looks up the location for the appropriate volume, it may discover that the resources 320 are spread among different servers 210. In such instances, it may be necessary for the single request made between the client 110 and the DSR 120 to generate a separate request and response between the DSR 120 and each server 210 responsible for one of the resources 320 of the appropriate volume 330. In such cases, steps 615 to 645 as described above are repeated as needed for each individual server 210 with which the DSR 120 must establish a connection. Once the appropriate connections are made and responses are received, the DSR may then complete the transaction with the client 110 by responding with a connection ID.

Load Balancing and Dynamic Volume Management

Certain embodiments of the DSR perform certain types of optimizations and management functions regarding the operation of the storage side of the system transparently to any client. Particular aspects of this functionality will now be discussed with regard to the embodiment shown and described in FIG. 3, above. Although reference will be made to the specific configuration of the system in FIG. 3, those of skill in the art will recognize that such techniques may be applied to other configurations, such as those shown in FIGS. 1 and 2, as well as to equivalent structures known to those in the art.

Figure 7:
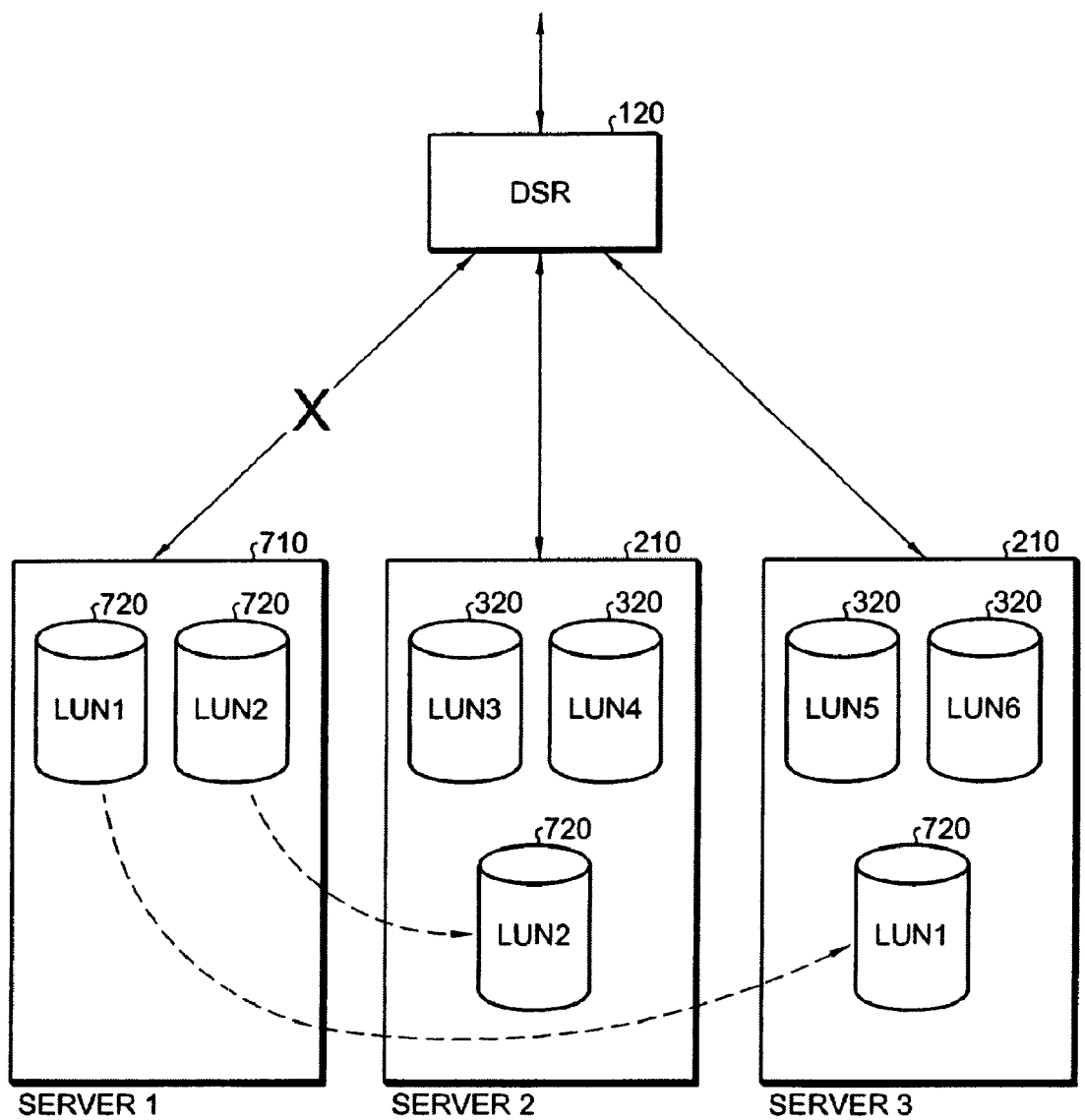
FIG. 7 illustrates an example of the remapping of resources between servers in the event of a server failure.

One type of storage management function that may be provided by the DSR 120 is to provide fault tolerance for any failures of servers 210 located on the storage side network 200. An example is shown in FIG. 7. Because each server 210 shown in FIG. 7 is connected via the storage network hub 220 shown in FIG. 3 and is therefore capable of communicating with each of the RAID controllers 310, any of the servers 210 may provide access to the resource 320 controlled by the RAID controllers 310. Each individual resource 320 may be assigned to a server 210, and this mapping between resources 320 and servers 210 is stored within a table in the storage area 450 of the DSR 120.

As illustrated in FIG. 7, the first two logical units are initially assigned to the first server 210, the next two logical units are assigned to the second server 210, and the remaining two are assigned to the third server 210. Although the complete multiplexing of connections is not shown in FIG. 7, as noted in the discussion of FIG. 3, each of the resources 320 is accessible through the storage area network from any of the servers 210. However, for purposes of efficiency, normally a server will handle access to a single resource at a time.

During normal operation, any requests involving the first two resources 320 will be handled by the first server 210, the second two resources 320 are handled by the second server 210 and the last two resources 320 are handled by the third server 210. FIG. 7 illustrates a circumstance where the first server 710 is no longer in proper communication with the DSR 120. This may be due to a failure in the first server 210 itself, or a failure of the communications link between the DSR 120 and the server 210, or a failure of the storage port 420 of the DSR 120 to which the particular server 210 is connected.

When such a failure occurs, any requests made by the DSR 120 of this failed server 710 will fail. When this occurs, the DSR 120 will become aware that it is unable to receive responses from this server 710, and the resource management process will find that messages sent to this server are unanswered. If each server 210 were directly connected to only those resources directly under the server's control, there would be no way to access the resource 720 belonging to the failed server 710, even if the corresponding RAID controller 310 and resources 320 themselves were still operational.

When requests to the failed server 710 are not responded to, the DSR 120 will recognize that no access to resources 720 can be made through that particular server 710. However, because the connections on the storage side are multiplexed through the hub 220, the DSR can send commands to the remaining servers 210, requesting them to handle the operations of the resources 720 previously assigned to the failed server 710. In this instance, the DSR 120 can request that the second server 210 take responsibility for any connections to the second resource 720 in addition to the two resources 320 it already handles. The DSR may also request that the third server 210 take responsibility for the first resource 720. In this way, the resources 720 which were being handled by the failed server 710 now remain accessible through the remaining two operational servers 210.

After the DSR receives confirmation that the remaining servers 210 can provide access to the remapped resources 720, the DSR 120 may store an updated resource table in its storage area 450. Once updated, any future traffic bound for those resources 720 will be directed to the operational servers 210 which are still running, rather than the failed first server 710. However, the client-side traffic related to those resources is unaffected. The same resources are provided by the DSR 120 to the client 110, and the client 110 need not be aware that any change in configuration of the resource table has occurred. Because the entire failure and remapping has taken place on the storage side of the DSR 120, the entire fail-over process is transparent to the client 110 and does not effect any connections made between the client 110 and the DSR 120.

Although the example shown in FIG. 7 and described above relates to a failure of a server 710, such automated failover may be provided by the DSR 120 for any of the systems which are connected to its storage side interfaces. Such a technique may be used to provide for fault tolerance by allowing healthy servers to take over for failed servers. This also allows for the replacement or upgrade of individual servers 210 without the need for taking the entire storage system off-line. By reassigning the control of resources to different servers, any individual server may be taken off-line without effecting the overall access to resources by clients. Additionally, by adding additional servers to provide additional capability, a single server can be kept available but unused and may take over from any server that fails. This allows a single server to provide a redundant backup function to any number of servers on the storage side network 200 without a diminishing of performance, regardless of the number of servers 210 on the network 200.

Similarly, failure capability may be provided at the level of the RAID controllers 310 themselves. Through the use of multiple RAID controllers, each of which have access to all of the storage units 320, the failure of a single RAID controller need not result in a loss of access to the volumes managed through that particular controller 310. When this failover feature at the RAID level is combined with the single system image capabilities of the DSR 120, it is possible to handle a failed controller 310 without the need to disturb any client sessions and connections.

The failure of a RAID controller 310 results in the control of the resources of that controller being handled by a different controller. If the two controllers were themselves being managed through different servers 210, then the failover results in the control of the sources of the failed RAID controller switching over to the other server 210 as well as to the other controller 310. If sessions and connections were being handled directly between the servers 210 and the clients 110 that were requesting access, this would result in broken connections and dropped sessions for the remapped resources.

However, by having the DSR 120 in a position to present a single system interface for the resources 320 to the client 110, the failover can be handled transparently to any clients 110 even when the servers or RAID controllers associated with a particular resource are changed. When the failover of a controller 310 occurs, the volumes now available through the remaining controller 310 will appear as resources to the server 210 handling that controller. The server 210 will broadcast these newly available resources the DSR 120. The DSR can update the resource table with the new mapping between the proper server and the resource, and simply proceed to redirect any further requests related to the shifted resources 320 to the new server 210 rather than the previous server. The DSR need not inform the client 110 of any of this change in operation.

In addition to providing a transparent means for fault tolerance and failover at both the server and controller level, the DSR may also be used to perform load balancing and related management tasks for the storage area network transparently to any connected clients. One example of this is the reassignment of storage resources 320 from one server to another based upon the current loading of the individual servers, or based upon any other operational metric or status of the servers.

For instance, as shown in FIG. 3, there may be three servers 210 available on the storage side network 200, the servers being used to access a number of resources 320 being managed by a pair of RAID controllers 310. Because each resource is associated with a particular server 210 in the resource table of the DSR 120, any request for that resource will go through that server. As the system runs, demand for particular resources 320 may increase while demand for other resources 320 decrease. If the resources 320 in demand are accessed through the same server 210, the performance associated with access to those resources 320 will decrease because the server 210 becomes a bottleneck in the smooth access to the resources from the DSR.

However, because the mapping between the resources 320 and the servers 210 is stored in the DSR 120 and can be modified dynamically, the DSR can be configured to automatically remap resources 320 in demand to servers 210 with excess capacity at that time. In this way if two of the resources accessed through one server 210 are in high demand, one of the two resources may be automatically remapped to be accessed through a different server 210 with more available capacity. As discussed above with reference to FIG. 7, by rewriting the resource table, this remapping may be done without interrupting client sessions and connections, while still providing the benefits of a more efficient distribution of bandwidth among the servers. Furthermore, if the demand for resources changes, the mapping may be reassigned again to rebalance the load.

In general, as the DSR 120 operates, it monitors the amount of activity and usage of each of the servers to which it is connected. The monitored parameters of the servers 210 may include such information as the hit rate on that server, the network activity experienced by the server, the CPU utilization of the server, the memory utilization of the server, or such other parameters as are known in the art to related to the load placed upon the server 210. An overall load for each server may be calculated based upon these parameters. In addition, the amount of load generated by requests associated with each of the resources 320 handled by that server may be monitored.

As the DSR runs, the load on each of the servers is periodically compared. If the load between each of the servers is approximately balanced, then there is no need for the DSR 120 to remap any of the assignments between the resources 320 and the servers 210. However, if the DSR 120 detects that one or more servers is significantly differently loaded than the others, the DSR may choose to reassign one or more of the resources 320 to a different server 210.

By analyzing the amount of load associated with each of the resources 320 on each server, the DSR 120 may attempt to determine whether there is a more efficient distribution of the resources among the server that will result in a more balanced load among the servers 210. If there is such a more balanced configuration, the DSR 120 may remap the resources 320 among the servers 210 in order to produce this more balanced load, update the mapping table in the storage 450 of the DSR 120, and then continue with its operation.

Figure 8A:
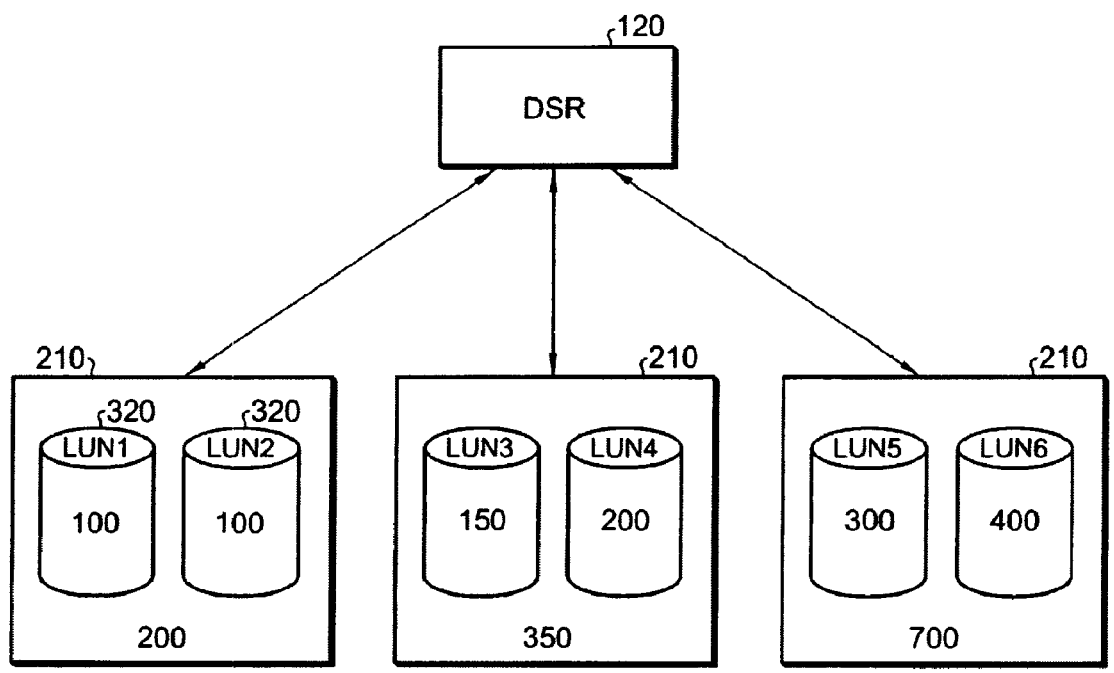
FIGS. 8A and 8B illustrate an example of balancing the load among servers by the DSR.

For instance, as shown in FIG. 8A, the operation of the system at a given time may indicate that for each of the six resources 320 being handled by the three servers 210, the respective loading due to each resource is as shown in the FIGURE: 100, 100, 150, 200, 300, 400. This results in a loading upon the first server of 200, a loading on the second of 350, and a loading on the third of 700. Note that these units are arbitrary and are intended for illustrative purposes only. This loading is clearly unbalanced as the third server has twice the load of either of the other servers.

Figure 8B:
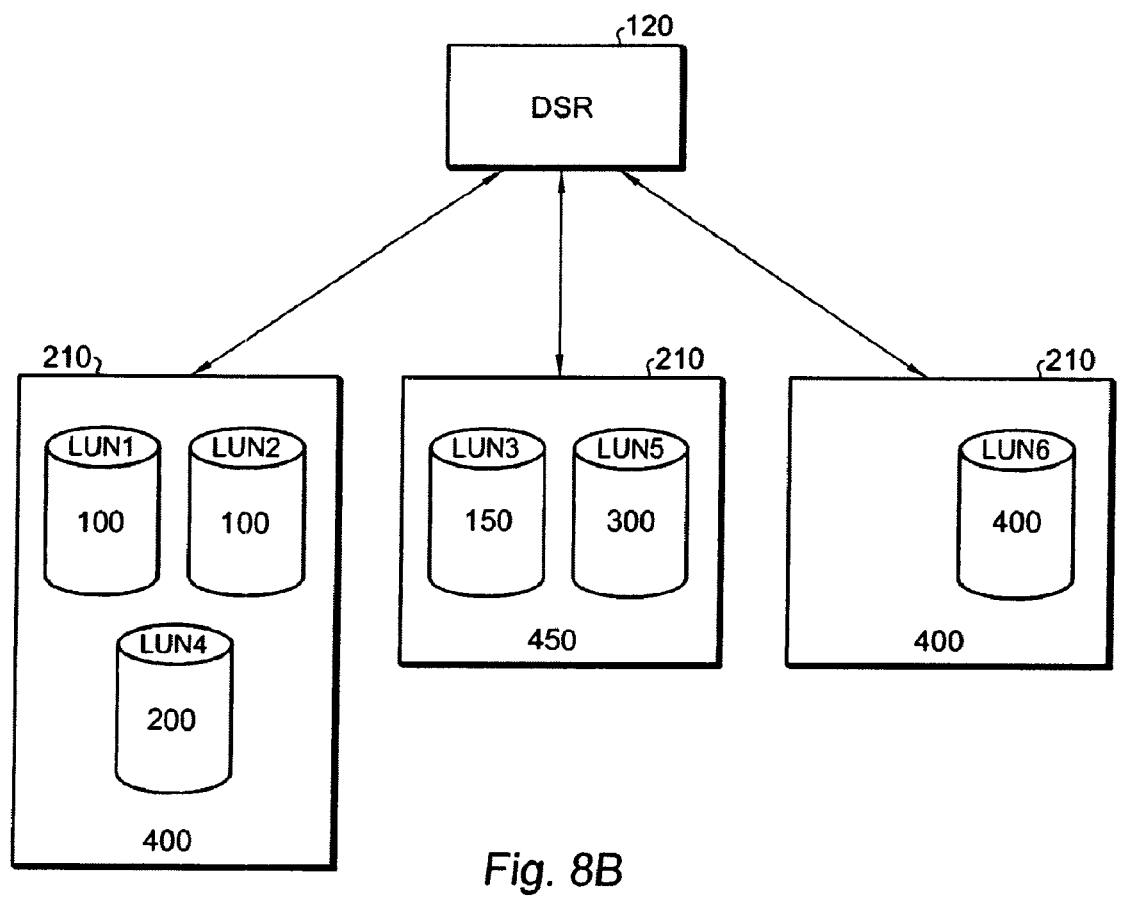

In order to rectify this situation and unbalance, the DSR 120 may ask the first server to take on the responsibilities of the fourth resource 320 from the second server, and ask the second server to take over handling the fifth resource for the third server. This configuration is shown in FIG. 8B. Note that although the load on the individual resources 320 have not changed, the overall distribution of the load among the three servers 210 is now more evenly distributed at a load of 400 for the first and third server, and a load of 450 for the second. This is true even though the third server 210 is handling a single resource 320 and the first is handling three resources 320.

In one embodiment, this load balancing process may be repeated periodically by the DSR 120 in order to maintain a balanced configuration. In an alternate embodiment, the load balancing may be triggered based upon the load conditions themselves, for instance, when the load on any one server exceeds the load on any other server by more than 50%. In other embodiments, predictive or adaptive algorithms may be used to estimate future load levels based upon current and historical operational patterns, and trigger load balancing based upon such projected levels of usage.

As above with the fail-over of servers, this remapping takes place without any impact on the connections or sessions maintained between the clients 110 and the DSR 120 and as a result, such remapping and balancing may be transparent to any user, even while there are open connections.

The various embodiments of dynamic system redirector and the load balancing and volume management possible using the systems and techniques described above in accordance with the invention thus provide a variety of ways to improve the performance, reliability or scalability of storage on electronic networks while retaining effective access to that storage from remotely located clients. In addition, the techniques described may be broadly applied across a variety of protocols, both stateful and stateless, and system architectures utilizing a variety of different subsystems.

Of course, it is to be understood that not necessarily all such objectives or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the fail-over process described with respect to FIG. 7 may be combined with the multiplexing of stateful sessions through the DSR. Similarly, the various techniques and architectures discussed above, as well as other known equivalents for each such feature, can be mixed and matched by one of ordinary skill in this art to construct storage systems in accordance with principles of the present invention.

Although this invention has been disclosed in the context of certain preferred embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A data storage system that provides dynamic remapping of resources, the data storage system comprising:
    a first network attached data storage device for storing one or more data storage resources connected to a raid controller;
    a storage area network hub coupled to the raid controller and in communication with the first network attached data storage device;
    at least one client device configured to request data from the first network attached data storage device;
    a first server in communication with the first network attached data storage device;
    a second server in communication with the first network attached data storage device, wherein the first and second servers communicate with the first network attached storage device via a local network; and
    a dynamic session redirector circuitry in communication with at least one client device via a stateful protocol and in communication with both the first server and the second server, wherein the dynamic session director circuitry is configured to access the first network attached data storage device in response to the request from the at least one client device, the dynamic session redirector circuitry is configured to access the first network attached data storage device through either the first server or the second server, the dynamic session redirector determining which server through which to access the first data storage device based upon the operational status of the first and second servers, wherein the dynamic session redirector circuitry maintains a table listing an association between the first network attached data storage device and the first and the second server through which the dynamic session redirector circuitry accesses the first network attached data storage device, and wherein the dynamic session redirector rewrites the table when the first network attached data storage device through a different server.

2. A data storage system as in claim 1 wherein the operational status comprises a failure status of the first and second servers.

3. A data storage system as in claim 1 wherein the operational status comprises a prediction of the expected load for the first and second servers.

4. A data storage system as in claim 1 wherein the operational status comprises a processing load being handled by the first and second servers.

5. A data storage system as in claim 1 wherein the operational status comprises a measure of the memory utilization of the first and second servers.

6. A data storage system that provides dynamic remapping of resources, the data storage system comprising:
    a first server;
    a second server;
    a plurality of network attached data storage devices which are accessible through the first server and the second server wherein the first and second servers communicate with the network attached data storage devices via a storage area network hub and one or more raid controllers; and
    a dynamic session redirector in communication with at least one client device via a stateful protocol and in communication with both the first server and the second server, wherein the dynamic session redirector sends requests for access to at least one of the plurality of network attached data storage devices in response to a request for access to data made to the dynamic session redirector by the at least one client device, and wherein the dynamic session redirector further comprises a table mapping at least one of the plurality of network attached data storage devices with at least one of the first server and second server, and the dynamic session redirector sends the request for access to the network attached data storage devices to one of the first server and second server based upon the mapping between the network attached data storage device being accessed and the server listed in the table, and wherein the dynamic session redirector may remap any of the plurality of network attached data storage devices with one of either the first server or second server based upon the status of the first and second servers.

7. A data storage system as in claim 6 wherein the client is provided with a single system interface including the network attached data storage devices of the first and second server by the dynamic session redirector.

8. A data storage system for providing a single system interface for multiple network attached data storage devices to clients connecting to the data storage system across a network via a stateful network protocol, the system comprising:
    a dynamic session redirector;
    a plurality of servers connected via a communications network to the dynamic session redirector;
    a storage area network hub connected to the one or more servers;
    one or more raid controllers connected to the storage area network hub, wherein the one or more servers communicate with the one or more raid controllers via the storage area network hub; and a plurality of data storage devices connected to the one or more raid controllers, the dynamic session redirector configured to provide a single system interface for accessing the plurality of data storage devices to a client connected to the data storage system, the redirector configured to receive requests from a client using a stateful protocol and to provide a first communications session between the client and the redirector in response to a request from the client, the dynamic session redirector sending requests for access to at least one of the plurality of data storage devices in response to the requests from the client, and wherein the dynamic session redirector further comprises a table mapping at least one of the plurality of data storage devices with one of the plurality of servers, and the dynamic session redirector sends the request for access to the data storage devices to one of the plurality of servers based upon the mapping between the data storage devices being accessed and the server listed in the table, and wherein the dynamic session redirector may remap any of the plurality of data storage devices to any of the plurality of servers based upon the status of the one or more servers.

9. A data storage system as in claim 8 wherein the redirector is further configured to send a request for access to the data storage devices to a second of the plurality of servers based upon the mapping between the data storage devices being accessed and the server listed in the table.

10. A data storage system that provides dynamic association of network attached data storage devices which are made available to clients connecting to the data storage system across a network, the data storage system comprising;
 a plurality of network attached data storage device means for storing of data;
 a first server means for providing access to the plurality of network attached data storage device means;
 a second server means for providing access to the plurality of storage device means, wherein the first and second server means communicate with the plurality of network attached data storage device means via a storage area network hub;
 one or more raid controller means connected to the storage area network hub, wherein the one or more servers communicate with the one or more raid controllers via the storage area network hub;
 a redirector means for receiving requests from a client for access to one of the plurality of network attached data storage device means, and for providing an association between the plurality of network attached data storage device means and one of the first server means and second server means, the redirector means also accessing one of the plurality of network attached data storage device means through the server means associated with the network attached data storage device means, the redirector means changing the association between any of the plurality of network data storage device means and the first or second server means based upon the status of the first and second server means.

11. A method for accessing data on a plurality of network attached data storage devices comprising:
 receiving a request for access to one of the plurality of network attached data storage devices wherein the plurality of network data devices are connected to a raid controller;
 looking up an association between the one of the network attached data storage devices and one of a plurality of servers for accessing the plurality of storage devices, wherein the plurality of servers communicate with the plurality of network attached data storage devices via a storage area network hub that is coupled with the raid controller;
 accessing the one of the network attached data storage devices through the one of the plurality of servers;
 determining the load on at least one of the plurality of servers; and
 assigning new associations between the plurality of network attached data storage devices and the plurality of servers based upon the load on at least one of the plurality of servers as determined by a dynamic session redirector in communication with at least one client device via a stateful protocol and in communication with the plurality of servers, wherein the dynamic session redirector sends requests for access to at least one of the plurality of network attached data storage devices in response to a request for access to data made to the dynamic session redirector by the plurality of servers, and wherein the dynamic session redirector further comprises a table mapping at least one of the plurality of network attached data storage devices with at least one of the plurality of servers, and the dynamic session redirector sends the request for access to the network attached data storage devices to one of the plurality of servers based upon the mapping between the network attached data storage device being accessed and the at least one server listed in the table, and wherein the dynamic session redirector may remap any of the plurality of network attached data storage devices with one of the plurality of servers based upon the status of the plurality of servers.

12. A method as in claim 11 wherein the step of accessing the one of the network attached data storage devices further comprises sending a first request to the one of the plurality of servers, and sending a second request to a second of the plurality of servers.

13. A method for accessing data on a plurality of network attached data storage devices comprising:
 receiving a request for access to one of the plurality of network attached data storage devices wherein the plurality of network data devices are connected to a raid controller;
 looking up an association between the one of the network attached data storage devices and a plurality of servers for accessing the plurality of network attached data storage devices wherein the plurality of servers communicate with the plurality of network attached data storage devices via a storage area network hub and one or more raid controllers;
 sending a first request to a first of the plurality of servers for accessing the one of the network attached data storage devices;
 sending a second request to a second of the plurality of servers for accessing the one of the network attached data storage devices;
 receiving a first response from the first server;
 receiving a second response from the second server;
 determining the load on at least one of the plurality of servers; and
 assigning new associations between the plurality of network attached data storage devices and the plurality of servers based upon the load on at least one of the servers as determined by a dynamic session redirector in communication with at least one client device via a stateful protocol and in communication with the plurality of servers, wherein the dynamic session redirector sends requests for access to at least one of the plurality of network attached data storage devices in response to a request for access to data made to the dynamic session redirector by the plurality of servers, and wherein the dynamic session redirector further comprises a table mapping at least one of the plurality of network attached data storage devices with at least one of the plurality of servers, and the dynamic session redirector sends the request for access to the network attached data storage devices to one of the plurality of servers based upon the mapping between the network attached data storage device being accessed and the at least one server listed in the table, and wherein the dynamic session redirector may remap any of the plurality of network attached data storage devices with one of the plurality of servers based upon the status of the plurality of servers.

14. A method for balancing the load among a plurality of servers being used to access a plurality of network attached data storage devices, the method comprising maintaining a table of associations between a plurality of, network attached data storage devices and a plurality of servers where at least one of the plurality of network attached data storage devices is assigned to one of the plurality of servers and wherein the plurality of servers communicate with the plurality of network attached data storage devices via a storage area network hub and one or more raid controllers;

evaluating the load imposed upon the plurality of servers by the network attached data storage devices associated with the plurality of servers;

determining whether the load imposed by the plurality of network attached data storage devices may be more evenly distributed among the plurality of servers by altering the associations between the plurality of network attached data storage devices and the plurality of servers; and updating the table of associations between the plurality of network attached data storage devices and the plurality of servers to reflect the more even distribution of load as determined by a dynamic session redirector in communication with at least one client device via a stateful protocol and in communication with the plurality of servers, wherein the dynamic session redirector sends requests for access to at least one of the plurality of network attached data storage devices in response to a request for access to data made to the dynamic session redirector by the plurality of servers, and wherein the dynamic session redirector further comprises a table mapping at least one of the plurality of network attached data storage devices with at least one of the plurality of servers, and the dynamic session redirector sends the request for access to the network attached data storage devices to one of the plurality of servers based upon the mapping between the network attached data storage device being accessed and the at least one server listed in the table, and wherein the dynamic session redirector may remap any of the plurality of network attached data storage devices with one of the plurality of servers based upon the status of the plurality of servers.

\* \* \* \* \*

UNITED STATES PATENT AND TRADEMARK OFFICE
CERTIFICATE OF CORRECTION

PATENT NO. : 7,089,281 B1 Page 1 of 1
APPLICATION NO. : 10/057842
DATED : August 8, 2006
INVENTOR(S) : Saied Kazemi et al.

It is certified that error appears in the above-identified patent and that said Letters Patent is hereby corrected as shown below:

Column 21, line 24, delete ","

Signed and Sealed this

Nineteenth Day of December, 2006

JON W. DUDAS
*Director of the United States Patent and Trademark Office*